(No Model.) 6 Sheets—Sheet 2.
R. W. COFFEE.
MACHINE FOR REMOVING STEMS FROM TOBACCO LEAVES.
No. 548,961. Patented Oct. 29, 1895.

Witnesses
John Imirie
Wm. Bagger

Inventor
Robert W. Coffee
By his Attorneys
C.A. Snow & Co.

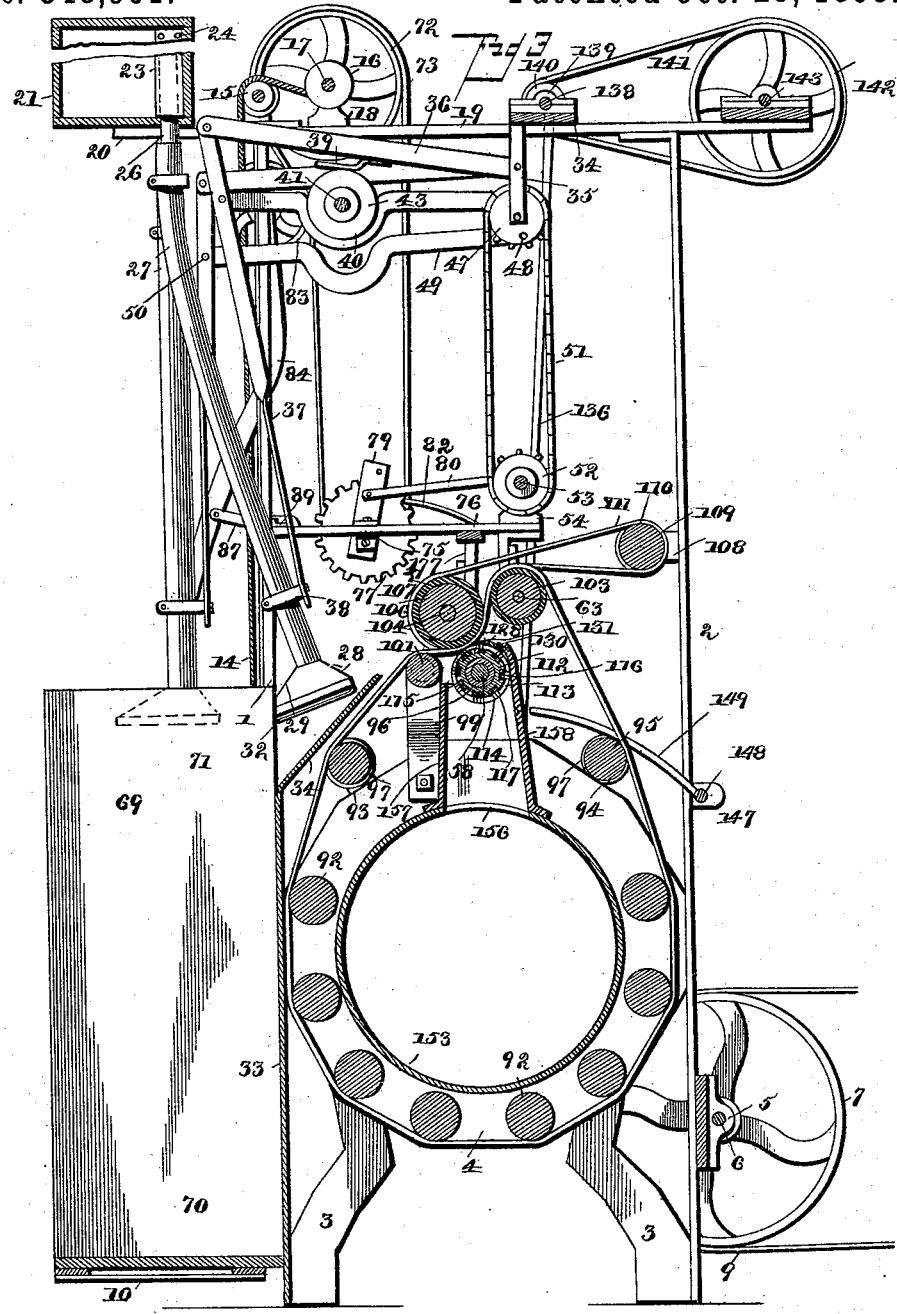

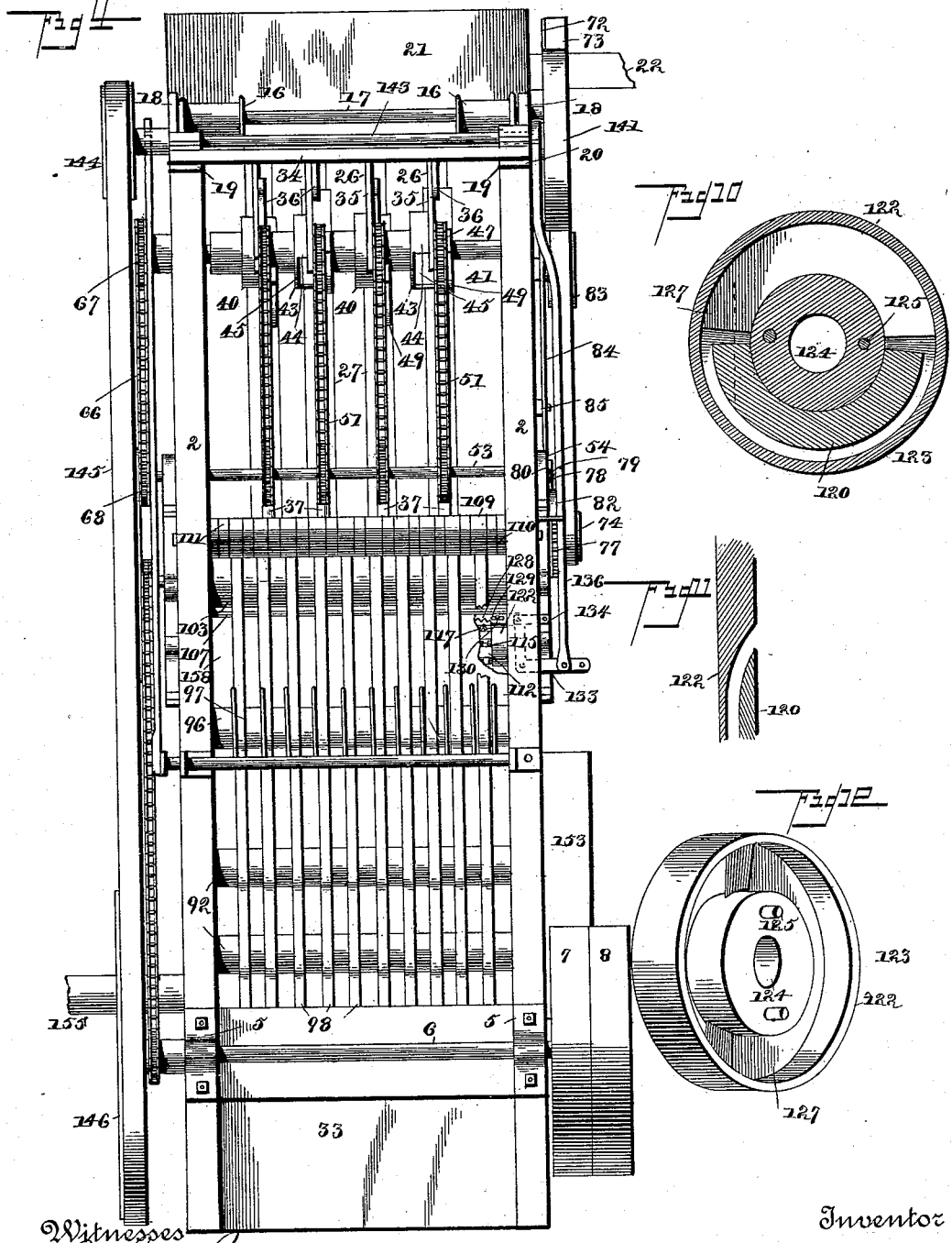

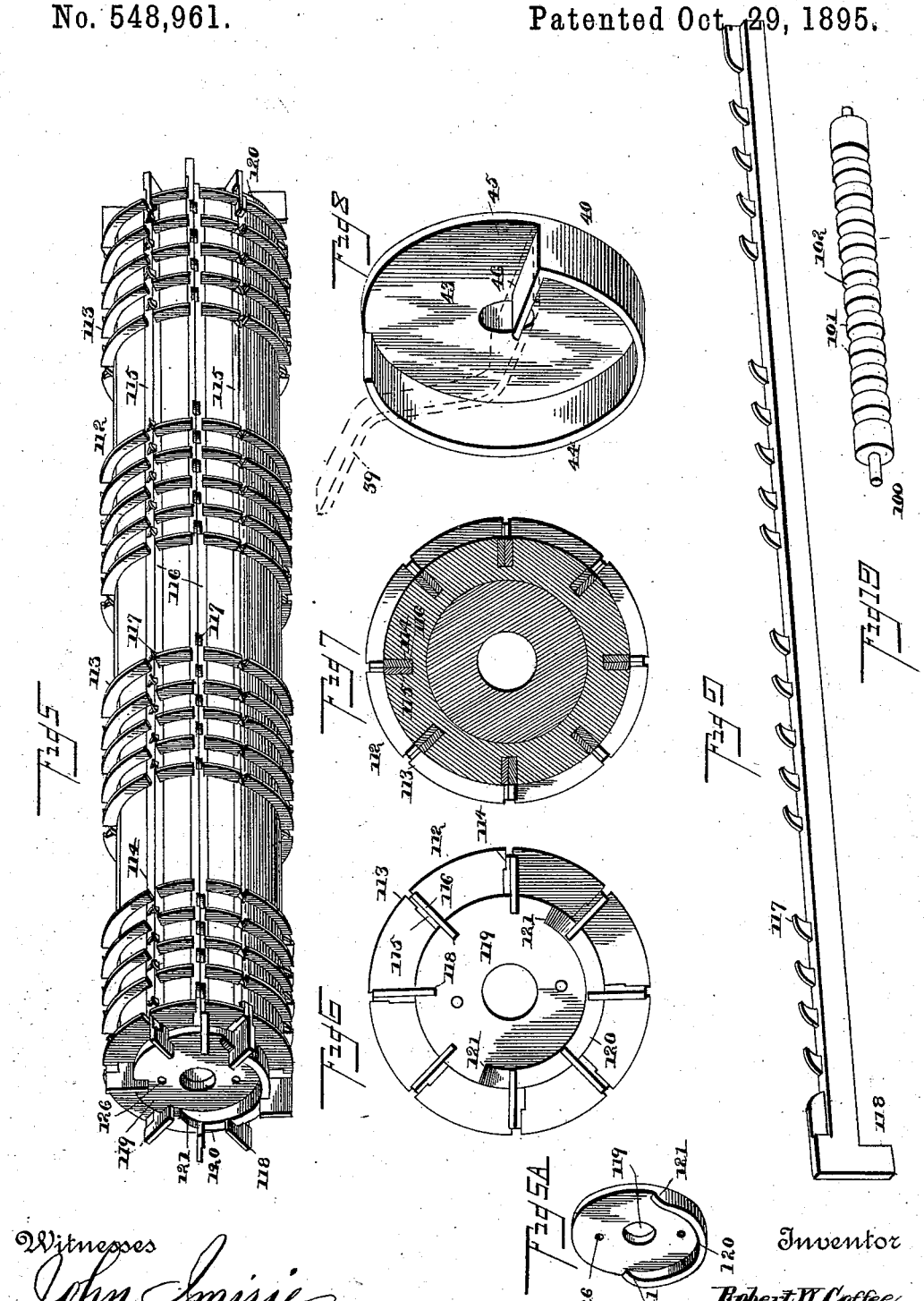

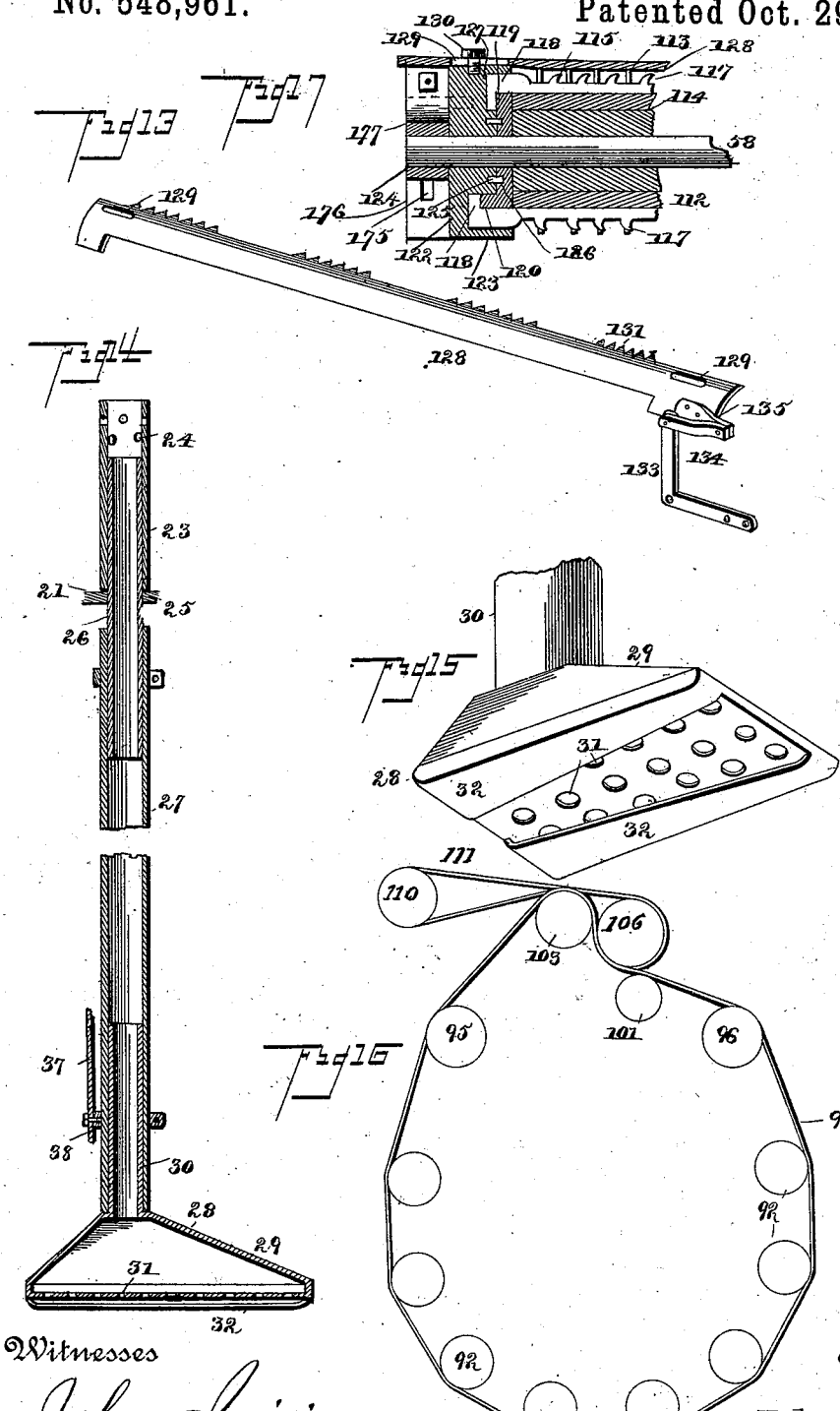

UNITED STATES PATENT OFFICE.

ROBERT W. COFFEE, OF LIBERTY, ASSIGNOR TO THE COFFEE STEMMING MACHINE COMPANY, OF BEDFORD CITY, VIRGINIA.

MACHINE FOR REMOVING STEMS FROM TOBACCO-LEAVES.

SPECIFICATION forming part of Letters Patent No. 548,961, dated October 29, 1895.

Application filed November 7, 1889. Serial No. 329,500. (No model.)

*To all whom it may concern:*

Be it known that I, ROBERT W. COFFEE, a citizen of the United States, residing at Liberty, in the county of Bedford and State of Virginia, have invented a new and useful Machine for Removing the Stems from Tobacco-Leaves, of which the following is a specification.

This invention relates to an improved machine for removing the stems from tobacco-leaves, and it has for its object to construct a machine of this class which shall be simple in construction and by means of which the operation of removing the stems from the leaves may be performed in an exceedingly rapid and at the same time perfect manner and without the assistance of manual labor, except for the purpose of feeding the machine, or rather supplying the trays or boxes in which the tobacco-leaves have been piled, ready for operation, the actual operation of feeding the individual leaves being performed automatically by the machine itself.

My invention therefore comprises an organized machine, by means of which the tobacco-leaves shall be fed singly between two sets of carrying bands or tapes, by means of which they are held securely and fed forward while being subjected to the operation of a series of transversely-reciprocating holders, which grasp the stem and hold it securely while it is being severed from the leaf, either by the action of a transversely-reciprocating cutter or by pulling it apart from the leaf. The leaves having thus been deprived of their stems are discharged over a vibratory platen, while the stems are collected within a cylinder located centrally in the frame of the machine, and from which they are removed by an air-blast from a rotary fan. The latter is furthermore utilized for the purpose of producing suction in a series of suction-cups mounted upon flexible stems and adapted to remove the leaves singly from the trays or holders and to deposit them upon the carrying bands or tapes of the machine.

The invention consists in the improved construction, arrangement, and combination of details which will be hereinafter fully described, and particularly pointed out in the claims.

Figure 1:
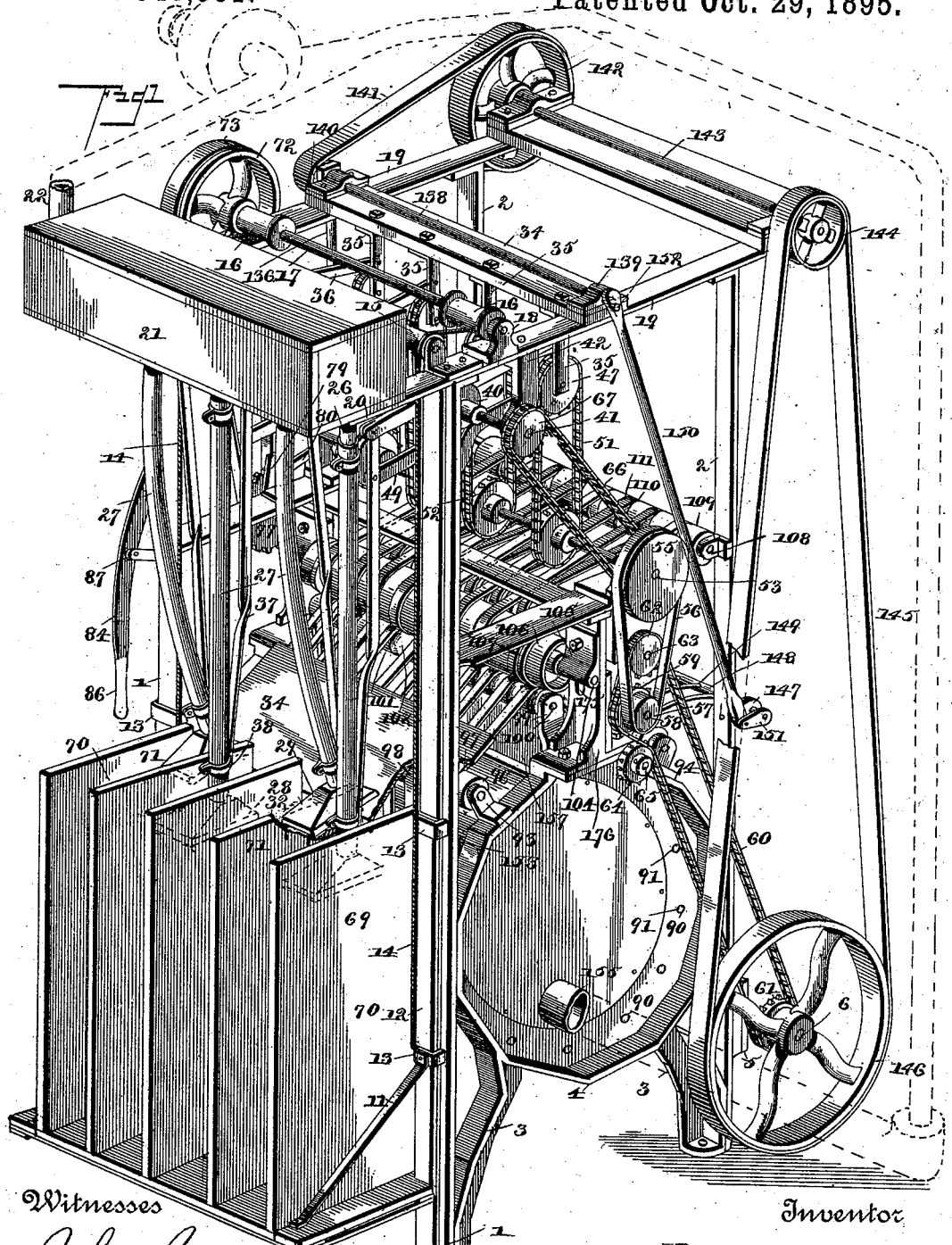
Figure 2:
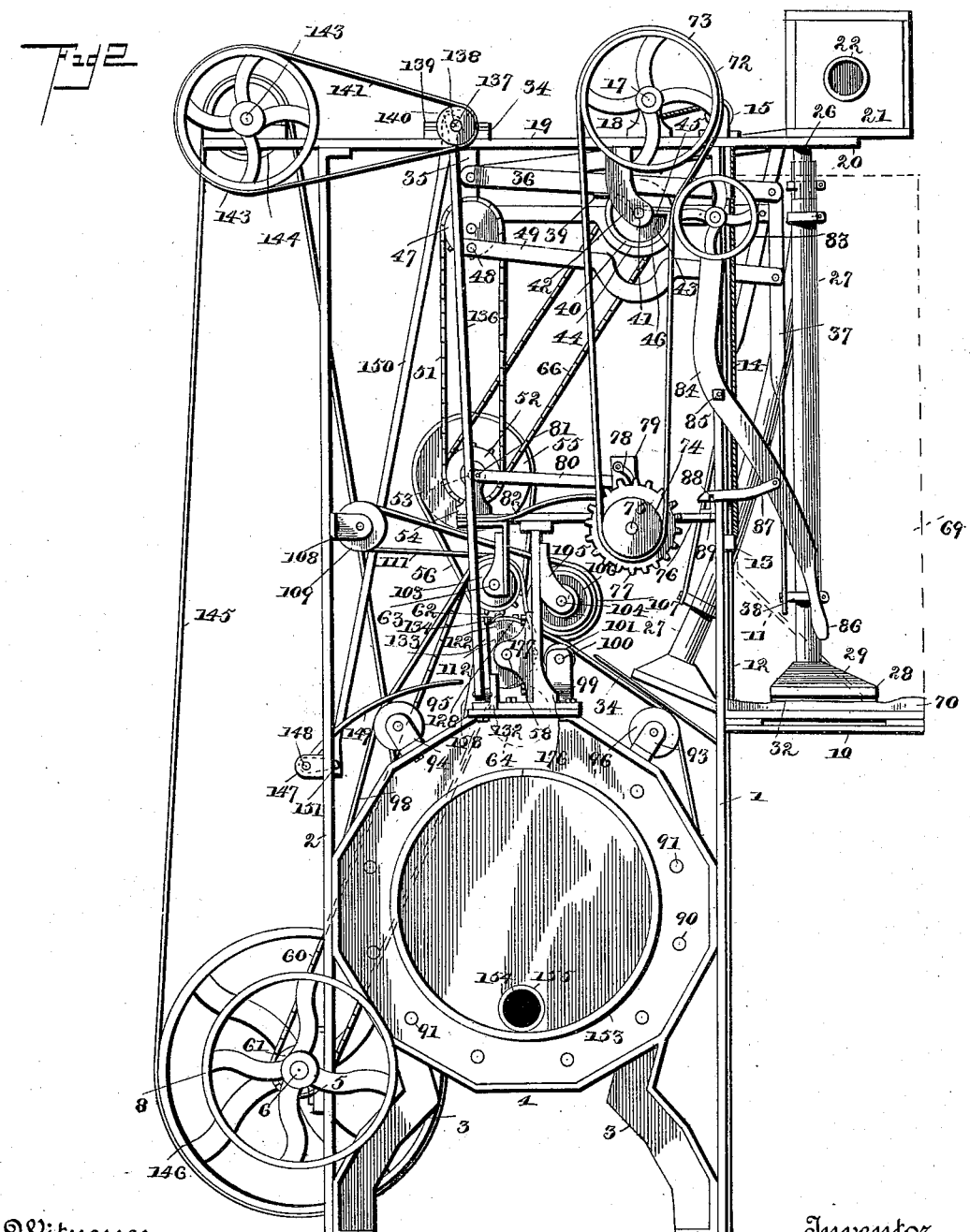

In the drawings hereto annexed, Figure 1 is a perspective view showing my improved stemming-machine in position for operation. Fig. 2 is a side view of the same. Fig. 3 is a vertical sectional view. Fig. 4 is a rear elevation. Fig. 5 is a perspective detail view of the stemming-clyinder. Fig. 5ᴬ is a perspective detail view of one of the cam-disks at the end of the stemming-cyliuder. Fig. 6 is an end elevation of the stemming-cylinder. Fig. 7 is a transverse sectional view of the same. Fig. 8 is a detail view of one of the cams for operating the levers, by means of which the suction-cups are actuated. Fig. 9 is a perspective detail view of one of the reciprocating holders of the stemming-cylinder. Figs. 10, 11, and 12 are detail views of the stemming-cylinder and of one of the stationary caps at one end of the latter. Fig. 13 is a detailed perspective view of the reciprocating cutter and of part of the operating mechanism. Fig. 14 is a vertical sectional view of one of the suction-cups, its stem, and the suction box or chamber. Fig. 15 is a detail perspective view of one of the suction-cups. Fig. 16 is a detail view of the endless carrying-tapes and rollers constituting the carrier. Fig. 17 is a detail view of one end of the reciprocating knife or cutter and the bearing for the same. Fig. 18 is a perspective detail view showing a modification in the construction of the teeth upon the reciprocating holders of the stemming-cylinder. Fig. 19 is a perspective detail view of the guide-roller 101.

Like numerals of reference indicate like parts in all the figures.

The frame of my improved machine comprises four vertical legs or uprights 1 1 and 2 2, which are suitably braced or connected, and which are provided on their inner adjacent sides with braces 3 3, connected by polygonal rings 4, the object of which will be hereinafter set forth.

The rear legs or uprights 2 of the machine are provided near their lower ends with boxes or bearings 5, in which is journaled the main shaft 6, which is provided with a fixed and a loose pulley, designated, respectively, by 7 and 8, and through the medium of which motion may be imparted to the main shaft by means of a belt 9 from suitable operating machinery.

The front uprights 1 1 of the frame constitute tracks or guides for a vertically-sliding platform 10, which is connected by means of braces 11 with the vertical guide-bars 12, which are provided with clamps 13 13, adapted to slide upon the uprights 1. Suitably connected to the guide-bars 12 are the lower ends of ropes 14, which pass over guide-pulleys 15, journaled at the top of the frame, and from thence to the winding-drums 16, to which the ends of the said ropes are attached. The winding-drums 16 are mounted securely upon a transverse shaft 17, which is journaled in bearings or boxes 18 upon the cross bars 19, which connect the front and rear uprights of the frame. It will be seen that by winding the ropes 14 upon the drums 16 the platform 10 will be caused to travel in an upward direction upon the frame-bars 1, while by unwinding the ropes the said platform will be lowered. The mechanism for raising and lowering the said platform will be more fully described hereinafter.

The cross-bars 19 project in front of the frame, so as to form brackets 20, which serve to support a suitably-shaped box 21, which is made air-tight, and which I designate as the "suction-box." One end of said box has an opening, which is connected by a pipe 22 with the casing of a suction-fan, which is indicated in the drawings by the numeral 300. It has not been attempted to show the exact construction or location of this exhaust-fan, inasmuch as it forms no distinct part of my invention, any exhaust-fan of ordinary well-known construction being employed; neither has it been attempted to preserve the proportions of said fan, this being deemed immaterial. The connecting-pipes have also been shown partly in dotted lines. Located within the suction-box 21 are a series of vertical pipes 23, which are provided near their upper ends with openings 24, and the lower ends of which are open, as shown at 25. The pipes 23 form bearings for the vertically-sliding tubes or pipes 26, to the lower ends of which are attached flexible tubes 27, the lower ends of which carry the suction-cups 28. The said suction-cups consist of rectangular boxes, the upper sides of which are beveled, as shown at 29, and provided with upwardly-extending tubes 30, by means of which they may be attached to the lower ends of the flexible tubes 27. The bottoms of the suction cups or boxes 28 are provided with numerous openings 31, and at the sides of the bottoms of said boxes are secured the rearwardly-converging flanges 32, which serve to guide the stems of the tobacco-leaves in the proper direction when the machine is in operation, as will be hereinafter described.

Secured to the front side of the frame is a sheet-metal guard or apron 33, the upper end of which is inclined in an upward and rearward direction, so as to form a table or platform 34, by means of which the tobacco-leaves will be guided as they are being delivered from the suction-cups to the endless carrying-tapes, as will be hereinafter described.

The cross bars or braces 19 at the top of the frame are connected by a transverse brace 34, which is provided with a series of downwardly-extending hangers 35, the number of which is equal to that of the vertically-movable suction-tubes 26. Pivotally connected to each of the hangers 35 is a forwardly-extending lever 36, the front end of which has a pitman 37, extending downwardly and connected at its lower end to a collar 38, encircling one of the flexible suction-tubes 27, near the lower end thereof. The levers 36 are provided on their under sides with angle-plates 39, forming contact-plates, which are adapted to be engaged and be actuated by the cams 40, a series of which is mounted upon a shaft 41, which is journaled transversely to the frame in hangers 42, extending downwardly from the braces 19. The said cams consist of disks 43, having laterally-extending flanges 44, which are broken or discontinued for about one-fourth of the periphery, as shown at 45, the front ends of said flanges being bent in a rearward direction, as shown at 46, nearly to the centers of the said cams. By this mechanism an oscillating or vibratory motion will be imparted to the levers 36 and pitmen 37, by means of which latter the suction-tubes, carrying the suction-cups 28, will thus be vertically reciprocated.

Suitably journaled to the lower end of each of the hangers 35 is a sprocket-wheel 47, having a laterally-extending wrist-pin 48, upon which is pivotally mounted a connecting-rod 49, the front end of which is pivotally connected at 50 with one of the pitmen 37. The sprocket-wheels 47 are connected by chains 51 with sprocket-wheels 52 upon a transverse shaft 53, mounted in bearings 54. One end of the transverse shaft 53 has a drum or band-wheel 55, which receives motion by means of the belt 56 from a drum or pulley 57, which is mounted upon a transverse shaft 58. The latter also carries a sprocket-wheel 59, which is connected by a chain 60 with a sprocket-wheel 61, mounted securely upon the main shaft 6. The chain 60 also passes over a sprocket-wheel 62 upon a transverse shaft 63, located above and slightly in rear of the shaft 57, and to which motion is thus likewise communicated. An idle sprocket-wheel 64, mounted upon a stub-axle 65, serves to impart the necessary degree of tension to the chain 60.

It will be seen that by the mechanism described motion is communicated from the main shaft to the shaft 58, thence to the shaft 53, and from the latter, by means of the chains 51, to the sprocket-wheels 47, having the laterally-extending wrist-pins 48, which are connected by the rods 49 with the pitmen 37. At the same time rotary motion is imparted to the shaft 41, carrying the cams 40, by means of a chain 66, connecting a sprocket-wheel 67 upon the said shaft 41 with a sprocket-wheel 68 upon the shaft 53, to which latter motion is communicated, as has been already described, by means of the belt 56 from the transverse shaft 58. While, therefore, an oscillating motion is imparted to the levers 36, which results in a vertically-reciprocating movement being imparted to the suction-pipes and their attachments, the lower ends of the said suction-pipes will, during their upward movement, be drawn in a rearward direction by the action of the connecting-rod 49 and the wrist-pins upon the sprocket wheels or disks 47. The inward or rearward movement of the lower ends of the said suction-pipes terminates at the point when the suction-cups are about in a line with the inner edge of the delivery table or platform 34. When this point has been reached, the forward and downward movement commences and continues until the contact-plates 39 of the levers 36 reach the cut-away portions of the flanges 44 of the eccentrics. The said levers and the suction-pipes will then drop suddenly until the contact-plate of the lever comes in contact with the rearwardly-extending portion 46 of the flange 44, at which point it is calculated that the suction-cup shall come in contact with a tobacco-leaf.

69 designates a box or tray adapted to be mounted removably upon the vertically-movable platform 10. The said box has a series of vertical partitions 70, by means of which it is subdivided into a series of compartments 71, corresponding in number and location to the number and location of the suction-tubes, directly below which the said compartments are arranged.

In practice the tobacco-leaves which are to be operated upon by the machine are piled in regular order in the compartments 71, and the tray 69, having been filled, is placed upon the platform 10 while the latter is at the lowermost limit of its movement.

The mechanism by means of which the vertically-movable platform 10 is carried in an upward direction is as follows: The shaft 17, carrying the winding-drums 16, is provided at one end with a band-wheel or drum 72, from which a belt or band 73 passes downwardly over a band-wheel or pulley 74, which is journaled upon a stud-axle 75, attached to a brace 76, which forms a part of the frame. Suitably attached to the side of the pulley 74, or formed integrally therewith, is spur-wheel 77, which is engaged by a pawl 78, pivoted to a lever 79, which is in turn mounted pivotally upon the stub-axle 75, adjacent to the spur-wheel 77. A pitman 80 connects the lever 79 with a crank or eccentric 81 upon the end of the shaft 53 opposite to the end which carries the band-wheel 55, to which reference has hereinbefore been made. It will be seen that by this mechanism an oscillating movement is imparted to the lever 79, the pawl of which 78 engages the spur-wheel 77. A spring-catch 82, engaging the teeth of the latter, serves to prevent backward movement thereof. Through the medium of the pulley 74, belt 73, and band-wheel 72 an intermittent and very gradual rotary motion is imparted to the shaft 17, thereby winding the ropes 14 upon the drums 17 of said shaft and gradually elevating the platform which carries the box or tray 69, in which the leaves have been piled, as previously described.

The belt 73 is kept taut or tightened for operation by means of a tightening-pulley 83, journaled upon the upper end of a lever 84, which is pivoted at 85 to one of the uprights of the frame. The lower end of said lever forms a handle 86, by means of which it may be manipulated by hand, and it is provided with a pivoted arm 87, having a notch 88 adapted to engage a catch 89, which is secured upon the front end of the brace 76 of the frame. Normally the notched arm 87 is in engagement with the catch 89, and the pulley at the upper end of the lever 84 is thus held in contact with the belt 73, which is thereby kept tightened for operation. When the vertically-movable platform 10 reaches the upper limit of its movement, one of the clamps 13, attached to the vertical guides 12, will strike against the under side of the pivoted arm 87, thereby lifting the latter out of engagement with the catch 89 and throwing the pulley 83 at the upper end of the lever 84 out of contact with the belt 73. The latter being thus slackened will not only cease to operate the shaft 17, but will permit the latter to rotate in a reverse direction, actuated by the weight of the platform 10, which unwinds the ropes 14 from the drums 16 until the said platform reaches the lower limit of its movement, when it remains stationary, thus permitting the empty box 69 to be removed and one which has been meanwhile filled with tobacco-leaves to be substituted. When this has been done, the lever 84 is operated by hand to throw the notched arm 87 into engagement with the catch 89, thereby tightening the belt and restoring the parts to operation.

The annular or polygonal rings 4 at the sides of the frame are provided each with a segmental series of bearings 90 for the transverse shafts 91, carrying guide-rollers 92, which extend transversely between the sides of the frame. Standards or brackets 93 and 94, extending upwardly from the rings 4, respectively at the front and rear sides of the frame, are provided with bearings for transverse shafts carrying, respectively, the rollers 95 96, each of which is provided with a series of annular grooves 97 to receive and guide a series of endless bands or tapes 98, which pass over the guide-rollers 92, 95, and 96.

Brackets 99, extending upwardly from the sides of the frame, are provided with bearings for a shaft 100, which is arranged transversely directly in front of the shaft 58, and which carries a cylindrical roller 101, having a series of annular grooves 102, which alternate with the annular grooves in the rollers 95 and 96, hereinbefore described, and which said grooves consequently occupy the spaces between the endless bands 98. From the cylinder or roller 101 the bands 98 pass over a roller 103, mounted upon the transverse shaft 63, which is located above and slightly in rear of the transverse shaft 58. From this point the endless bands pass downwardly over rollers 95 and 92 and complete the circuit.

104 designates a shaft mounted in boxes or bearings 105 and extending transversely above and slightly in front of the transverse shaft 58. The shaft 104 carries a roller 106, which presses or bears against the endless belts or bands 98 at a point between the rollers 101 and 103. The rollers 103 and 106 are provided each with a coating or covering 107, of rubber or other suitable elastic material.

The rear uprights 2 of the frame are provided with brackets 108, affording bearings for a transverse shaft carrying a roller 109, which is provided with annular grooves 110 to guide a series of endless bands or tapes 111, which pass around the rollers 106 and 109, and the under sides of which bear against the upper side of the transverse roller 103.

It will be observed that the two series of endless belts 98 and 111 and their supporting-rollers coact to form a carrier, which is adapted to seize the tobacco-leaves as they are being delivered by the suction-cups 28 between the rollers 101 and 106 and to convey them in an upward and rearward direction, discharging them over the rear side of the roller 103. In thus carrying the tobacco-leaves they are conveyed directly past and in contact with the stemming mechanism, which I shall now proceed to describe.

112 designates the stemming-cylinder, which is mounted securely upon the transverse shaft 58, and the extreme periphery of which is in contact with the elastic surface of the roller 106. The said stemming-cylinder is provided with several sets or series of annular flanges 113, each set corresponding with one of the suction-cups hereinbefore described. The annular flanges 113 are intersected by longitudinal grooves 114, of which there may be any desired number. In the drawings hereto annexed eight such grooves arranged equidistantly around the periphery of the cylinder have been shown. In each of the said grooves is arranged a pair of oppositely-reciprocating holders or devices to grasp the stems of the tobacco-leaves while they are being operated upon by the machine. These holders, which are designated, respectively, by 115 and 116, are provided with outwardly-extending hook-shaped teeth 117, which are inclined in opposite directions, and the points of which, when the holders are at the inner limit of their respective movements, are adapted to slightly pass each other, while, when the said holders are at the outer limits of their respective movements, the said hook-shaped teeth shall be sufficiently separated to enable them to grasp the stem of the tobacco-leaf. The hook-shaped teeth have been arranged in series upon the several holders for the purpose of insuring certainty in the operation of the machine, and any desired number of teeth may constitute each series. The annular rims or flanges 113, which have been arranged in series for a like purpose, are intended to guide the stems of the tobacco-leaves into contact with the holding-teeth.

For the purpose of imparting reciprocating movement in opposite directions to the holders 115 and 116 I avail myself of mechanism as follows: The said holders are provided at opposite ends of their lengths with downwardly-extending arms 118. These arms are extended beyond disks 119, one of which is arranged at each end of the cylinder and in contact therewith. The disks 119, however, do not revolve with the cylinder, but are held stationary by means which will be presently described. The said disks 119 are provided each with a lateral outwardly-extending flange 120, extending around one-half the periphery of the said disks 119. The flanges 120, which are provided with beveled ends 121, are located on corresponding sides of the two disks 119. It will be seen that when the cylinder revolves each of the arms 118 of the holders 115 or 116, as the case may be, on coming in contact with the flange or cam 120 will be forced in an outward direction. Hence the arms 118 of each pair of holders will be actuated and forced outwardly at the same time, and the holders of each pair will be operated simultaneously in opposite directions, thus bringing the holding-teeth 117 together or apart, as the case may be.

Suitably secured to brackets upon the frame of the machine, at each end of the stemming-cylinder, is a cap 122, having an inwardly-extending annular flange 123, which surrounds the head of the cylinder and forms at each end of the cylinder a bearing, which serves to retain the transversely-reciprocating holders in operative position. The caps 122, which are provided with openings 124 for the passage of the transverse shaft 58, carrying the stemming-cylinder, are provided on their inner faces with laterally-extending studs or spurs 125, which engage recesses or perforations 126 in the disks 119, which are thereby held in position and prevented from rotating. The inner sides of the caps 122 are provided with semicircular or segmental cam-shaped flanges 127, which are located diametrically oppose to the cams 120 of the disks 119. The cams 127 serve by contact with the arms 118 to force the transversely-reciprocating holders 115 and 116 inwardly in their respective grooves or bearings in the stemming-cylinder.

It will be seen from the foregoing description that when the cylinder is rotated by the chain 60 from the main shaft, engaging the sprocket-wheel 59 upon the shaft 58 of said cylinder, the holders 115 and 116 of each pair are forced simultaneously in opposite directions by contact of the arms 118 at their opposite ends with the cams 120 or 127, as the case may be. It will also be seen that owing to the fact that each of said cams extends around one half the periphery one half of the holders will be moved inwardly and into engagement with each other, while the remaining half occupy a position at the outer limit of their respective movements, with their teeth 117 spread apart. The part of the cylinder the reciprocating holders of which are active is the upper portion or the portion beginning at the point at which the periphery of the stemming-cylinder is in contact with the elastic roller 106. The lower part of the cylinder, the transversely-reciprocating holders of which are temporarily inactive, is that at which the said holders are in readiness to grasp the stems of the leaves that are being fed by the endless bands or tapes 98 under the flexible roller 106.

The caps 122, which are mounted permanently, as described, at the ends of the stemming-cylinder, serve the additional purpose of supporting a transversely-reciprocating knife or cutter 128, the ends of which are provided with slots 129 to receive set-screws 130, by means of which the said reciprocating-cutter is mounted to slide transversely upon the said caps 122. The body of the knife or cutter 128 is curved in cross-section to correspond with the periphery of the stem-cylinder, across the entire length of which it extends. The front edge of the said cutter is armed with teeth 131, which are arranged in series to correspond with the series of grasping-teeth upon the transversely-reciprocating holders 115 116. The toothed front edge of the cutter 128 extends nearly to the point at which the stemming-cylinder is in contact with the roller 106. Suitably pivoted to a bracket 132, extending laterally from the frame of the machine, is a bell-crank lever 133, one arm of which is connected by a pitman 134 with a bracket 135, extending from one end of the cutter 128. The other arm of the bell-crank 133 is connected by a pitman 136 with a crank 137 upon a shaft 138, which is mounted transversely on top of the frame in boxes 139, provided for the purpose. It will be seen that by this mechanism a reciprocating motion is imparted to the cutter 128 when the machine is in operation. Motion is imparted to the shaft 138 by means of a pulley 140, which is mounted on said shaft and which is connected by a belt 141 with a band-wheel 142 upon a transverse shaft 143, which is in turn provided with a pulley 144, connected by a belt 145 with a drum or drive-wheel 146 upon the main shaft 6 of the machine. It is obvious that by properly proportioning the sizes of the drums and pulleys 146, 144, 142, and 140 the reciprocating motion imparted to the cutter 128 may be made exceedingly rapid.

Brackets 147, extending from the rear uprights of the frame, form bearings for a transverse shaft 148, having a series of rearwardly-extending curved fingers 149, forming a rake or platen. The said curved fingers extend forwardly above and beyond the roller 95 between the endless tapes or bands upon the latter, and they serve to receive the stemmed tobacco-leaves as the latter are being delivered from between the endless bands 98 and 111. An oscillating movement is imparted to the shaft 148 by means of a pitman 150, which connects a crank 151 at one end of the said shaft with a crank 152 upon the shaft 138, which has been already described, and which receives its motion from the main shaft of the machine through the medium of the belts 145 141 and the several pulleys, arranged as already described. It will be seen that as the stemmed tobacco-leaves are delivered from between the endless tapes or carriers 98 and 111 they will drop upon the curved fingers 149, constituting the oscillating rake or platen, and that the latter will throw them in a rearward direction and discharge them into a box or upon a table which has been placed in position to receive them.

I desire at this point to state that the material of which the endless bands 98 and 111 are preferably constructed is sheet-brass or some other suitable thin flexible sheet metal. This is for the purpose of enabling the said bands to sustain the wear to which they will necessarily be subjected and which is caused especially by the transversely-reciprocating knife or cutter 128.

153 designates a cylinder, constructed of sheet metal and arranged transversely in the frame of the machine within the annular rings 4, which constitute a portion of the said frame. Said cylinder is open at one end. The other end is closed and provided with an opening 154, which may be connected by a pipe 155 with the discharge-opening of the suction-fan, which is used in connection with my invention, but which, as previously stated, has not been shown in the drawings for the reason that no novelty is claimed in the construction thereof. The upper side of the cylinder 153 is provided with a transverse slot 156, extending through the entire length of said cylinder and provided at its front and rear edges with upwardly-extending aprons or guard-plates 157 and 158, the latter of which is extended in rear of the stemming-cylinder and forms a guard for the latter, the upper end of said plate being slightly curved, as shown, so as to conform to the contour of the cylinder. As the stems are being removed from the tobacco-leaves by the mechanism herein described, they will be guided downwardly to the cylinder by the guard-plate 158 and will drop into the cylindrical casing 153, from which as fast as they drop they are blown out through the open side of said cylinder by the air-blast connected with the opposite end of the latter. In this manner the stems are effectually disposed of and are prevented from accumulating to the detriment of the operation of the machine.

The operation of my invention is as follows: First of all, the tobacco-leaves which are to be deprived of their stems are piled in the compartments 71 of the box 69. Several of these boxes are to be used, so that one or more of the said boxes may be filled and kept in readiness for the machine, while the contents of another is being operated upon. To place the box or tray 69 in position for operation, the platform 10 should first be lowered to the extreme limit of its movement. This may be accomplished by first releasing the notched arm 87 of the lever 84 from engagement with the catch 89, thus slackening the belt 73. The platform having been permitted to descend, one of the trays or boxes 69, filled with tobacco-leaves, is placed in position, and the lever 84 is then again manipulated to throw the notched arm 87 into engagement with the catch 89, thus tightening the belt 73 and throwing the mechanism for elevating the platform 10 into operation. At the same time motion is imparted to the main shaft 6 of the machine by means of the belt 9. The suction-fan, which is connected with the suction-box 21 and with the cylindrical casing 153, is also started in operation. From the main shaft of the machine motion is transmitted through the chain 60 to the shaft 58, and from said shaft by means of the belt 56 to the shaft 53, and thence through the chain 66 to the shaft 41, carrying the cams 40, by means of which an oscillating or vibratory movement is communicated to the levers 36, the outer ends of which are connected by the pitman 37 with the flexible suction-tubes 27, the lower ends of which carry the suction-cups 28. By this mechanism a vertically-reciprocating movement is imparted to the suction tubes and cups, the rigid tubes 26, at the upper ends of the flexible tubes, being mounted to slide vertically in the guide-tubes 23, mounted in the suction-box. At the same time motion is transmitted from the shaft 53, by means of the sprocket-wheels 52 and chains 51, to the sprocket-wheels 47, journaled to the hangers 35 below the levers 36, the rear ends of which are connected pivotally to the said hangers. It follows from the relative arrangement of the parts that when the front ends of the levers 36 reach the upper limit of their movements the pitmen 37, which are connected by the connecting-rods 49 with the wrist-pins 48, extending laterally from the sprocket wheels or disks 47, will be drawn in a rearward direction until the suction-cups at the lower ends of the suction-tubes approach the carrier comprising the two sets of tapes or bands 98 and 111. When the suction-tubes carrying the suction-cups reach the lower limit of their respective movements, the under side of the said suction-cups will come in contact with the upper sides of the piles of tobacco-leaves. The uppermost leaf of the pile will be caused to adhere by suction to the under side of the cup and will be lifted by the latter as it starts on its upward movement and be carried in an upward and rearward direction toward the carrier. The inclined table 34 will serve to straigthen and guide the leaf as it approaches the endless tapes until it is eventually grasped by the two sets of bands 98 and 111 between the front sides of the rollers 101 and 106. The converging flanges 32, upon the under side of each of the suction-cups, will serve to guide the stem of the leaf in the proper direction, and it will be seen that at the moment when the end of the leaf is grasped by the carrier it is flattened or straightened, owing to the suction, which still causes it to adhere to the under side of the suction-cup, and by reason of which it is gradually pulled from the under side of the latter. Owing to this mechanism each leaf will be smooth and straightened as it passes into the carrier, and will therefore be operated upon with far more evenness and accuracy than would otherwise be possible. The leaves having been delivered by the suction-cups to the carrier the said suction-cups will be moved forwardly and downwardly toward the piles of the tobacco-leaves in the box or tray 69. It will be seen that the extent of the downward movement of the suction-cups is limited by the stroke of the levers 36. Hence it becomes necessary to feed or move the piles of leaves in an upward direction, in order that the suction-cups may come into contact with the leaves at each operation. The feed movement for this purpose comprises the pulley 74, mounted upon the shaft 75 and connected by the endless belt 73 with the drum 72 upon the shaft 17, having the winding-drums 16, which are connected by the ropes 14 with the vertically-movable platform 10, a regular but slow intermittent movement being imparted to the said feeding mechanism by means of the pitman 80, connecting the crank or eccentric 81 upon the shaft 53 with the lever 79, carrying the pawl 78, engaging the spur-wheel 77, which is connected or formed integrally with the pulley 74. The spring 82 serves to prevent retrograde movement. It will be seen that by this mechanism the box or tray of tobacco-leaves is fed evenly and regularly in an upward direction, so that the uppermost leaf in each pile shall always be within reach of the corresponding suction-cup when the latter reaches the limit of its downward movement. As each tobacco-leaf is grasped between the two sets of endless bands 98 and 111, it is carried between the stemming-cylinder and the flexible roller 106 in an upward direction and eventually over the flexible roller 103, in contact with which latter, as well as with roller 106, it is held by the endless bands 111 and 98. As the tip end of the leaf approaches the stemming-cylinder, the front end of the stem will of necessity be guided between two of the annular rings or flanges 113 upon the stemming-cylinder, the outer edges of which flanges bear lightly against the flexible roller 106, so as to prevent the stem from escaping laterally. The tobacco-stem is, as is well known, of greater thickness than the leaf, forming a rib of sufficient thickness to be guided successfully between the flanges without any necessity for having such forcible contact between the edges of the flanges 113 and the flexible roller 106 as might prove injurious to the tobacco-leaves. At the point where the stem of the leaf enters between the flanges 113 the teeth 117 of the holders 115 and 116 are separated from each other; but as soon as the tobacco stem has come fairly in contact with the stemming-cylinder the holders 115 116 close together, and the teeth 117 of said holders will thus be caused to grasp the stem and hold it securely in contact with the periphery of the stemming-cylinder. It will thus be seen that while the leaf is being carried in an upward and rearward direction by means of the endless bands 98 and 111, between the flexible rollers 106 and 103 and over the latter, the stem is held by the teeth 117 of the transversely-movable holders 115 and 116 in contact with the periphery of the stemming-cylinder, and is thus gradually pulled asunder from the leaf. This operation is assisted by the transversely-reciprocating knife or cutter 128, the teeth 131 at the front edge of which operate at the intersection of the stemming-cylinder and the lower rear edge of the flexible roller 106. This cutter, which acts somewhat in the nature of a saw, serves to sever the stem neatly from the leaf, thereby avoiding all possibility of injury to the latter which might probably result from the stem being pulled forcibly apart therefrom. The tobacco-leaf having been deprived of its stem continues its upward and rearward course, as already described between the two sets of endless bands until it is eventually discharged over the rear side of the roller 103 and is dropped onto the rake or platen composed of the curved fingers 149, to which a rapid vibratory motion is imparted from the crank-shaft 138, having the crank 152, by means of the pitman 150, connecting said crank with the crank 151 upon the rock-shaft 148, to which the said curved fingers are attached. The stems, on the other hand, remain grasped by the teeth 117 of the holders 115 and 116 until the cylinder completes a one-half revolution, when by the actuating mechanism herein described the holders are separated, thus releasing the stems and permitting them to drop between the guards 157 and 158 and through the slot 56 into the cylinder 153, from whence they are blown out to one side of the machine, where they may be readily gathered and disposed of.

In Fig. 18 of the drawings I have illustrated a modification of my invention which relates to the construction of the transversely-movable holders which form a part of the stemming-cylinder, and which has for its object to provide for an improved construction of grasping jaws or blades to be substituted for the hook-shaped teeth hereinbefore described, and which may prove to be preferable. By this improvement the transversely-movable holders 115 and 116 are provided with outwardly-extending arms 159 and 160, the outer ends of which are provided with cutting-blades 161 and 162, extending in opposite directions and provided with cutting-edges 163, that face each other. The extent of the movement of the holders will be so calculated that when each reaches the extreme inward limit of its movement the cutting-edges of the blades 161 and 162 shall come in contact with each other, and thus serve not merely to grasp the stem of the tobacco-leaf between the arms or shanks 159 and 160, but actually to sever it from the leaf. It is obvious that the inner or adjoining sides of the shanks 159 and 160 will be provided with concave recesses (designated by 164) for the accommodation of the tobacco-stem. When this form of cutting-blades is employed, the laterally-reciprocating cutter 128 may be dispensed with, inasmuch as the stem will be almost completely severed from the leaf by the action of said cutters. The said reciprocating cutter may, however, when desired, be retained when the cutting-blades which have just been described are used.

From the foregoing description, taken in connection with the drawings hereto annexed, the operation and advantages of my invention will be readily understood.

The process of stemming tobacco has heretofore usually been performed by hand and has been comparatively slow and laborious. By my invention all manual labor for the purpose of depriving the leaves of their stems is dispensed with, the operation of the machine being entirely automatic, and the sole attendance required being for the purpose of supplying the trays or boxes with piles of tobacco-leaves and for removing the leaves as fast as they are being delivered from the machine. It follows that the cost of stemming the tobacco is materially reduced.

The general construction of the machine is comparatively simple and is of such a nature that there is little liability of its getting out of order. The suction device which is used for feeding the leaves singly to the stemming mechanism is so arranged as to perform the feeding operation quite as regularly and efficiently as if performed by hand. A valuable feature of the machine lies in the fact that the leaves are not suddenly released when grasped by the stemming-cylinder, but are retained in contact with the suction-cups, so that they will be drawn out smoothly and evenly while passing through the machine. The tobacco is thereby improved in appearance and in value, and all danger of crumbling or crushing the individual leaves while passing through the machine is thereby avoided.

It may be well to state with regard to the suction mechanism that it is by no means necessary that the suction-cups should operate simultaneously, nor are they, in fact arranged to do so. The suction created by the fan merely causes a strong upward draft in each of the individual suction-tubes, which I have found in practice to be amply sufficient to cause the tobacco-leaves to adhere to the under sides of the suction-cups with a sufficient degree of tenacity for the purposes indicated.

For a certain class of trade it is desirable to remove only a portion of the stem—namely, the butt—the upper thin portion being permitted to remain. In order to enable this to be accomplished, the roller 106 is made vertically adjustable by forming slots 175 in the frame-pieces 176 to which the boxes 177, in which the shaft of said roller is journaled, are attached. It will be seen that by raising the roller 106 slightly from the face of the stemming-cylinder the reciprocating holders of the latter will not grasp the stem until the latter has acquired a certain thickness and the thin portion of the stem will be suffered to remain in the leaf.

I desire it to be understood that in the practical manufacture of my machine I reserve the right to make any modifications and changes in the detailed construction thereof which fall within the scope of the invention and which may be resorted to without departing from the spirit thereof.

Having thus described my invention, what I claim, and desire to secure by Letters Patent, is—

1. In a machine for stemming tobacco, the combination of a suction box, vertically arranged guide pipes within the same, the vertically reciprocating suction tubes, having flexible extensions provided with suction cups at their lower ends, and operating mechanism for imparting to said suction cups a vertically and laterally reciprocating motion substantially as set forth.

2. The combination of a suction box, the guide pipes arranged vertically within the same and having perforations at their upper ends, the vertically reciprocating suction tubes mounted in said guide pipes, the flexible extensions of said suction tubes, carrying suction cups at their lower ends, and mechanism for imparting to said suction cups a vertically and laterally reciprocating motion, substantially as set forth.

3. The combination of the vertically reciprocating suction tubes having flexible extensions provided with suction cups at their lower ends, with the operating levers, the pitmen connecting the outer ends of said levers with the flexible extensions of the said suction tubes and operating mechanism, substantially as set forth.

4. The combination with the vertically reciprocating suction tubes, having flexible extensions provided with suction cups at their lower ends, of mechanism for imparting a vertical reciprocating movement to the said suction tubes, and for moving the lower ends of said tubes carrying the suction cups in a rearward direction at the upper limit of the vertical movement, substantially as set forth.

5. The combination of the suction box, the vertically reciprocating suction tubes having flexible extensions carrying suction cups at their lower ends, the operating levers, the pitmen connecting the outer ends of said levers with collars encircling the lower ends of the flexible extensions, the cams for actuating the said levers, the disks mounted revolubly below the fulcra of the operating levers and having laterally extending wrist pins and the rods connecting the latter with the pitmen whereby the cups are reciprocated laterally, substantially as set forth.

6. The suction cups provided with perforated bottoms and with rearwardly converging flanges on their under sides, substantially as and for the purpose herein set forth.

7. The combination with the operating levers having angular contact plates, of the operating cams consisting of disks having laterally extending flanges which are broken or discontinued for a portion of the peripheries and provided with inward radial extensions at one end and pitmen connecting said levers with the tubes carrying the suction cups, substantially as and for the purpose herein set forth.

8. The combination of the frame having a transverse brace at its upper end, the hangers depending from the said brace, the levers pivoted to the said hangers, the vertically reciprocating suction tubes having flexible extensions carrying the suction cups, the pitmen connecting said flexible extensions with the levers, the sprocket wheels journaled to the said hangers and having laterally extending wrist pins, the rods connecting the latter with the pitmen, a countershaft having a series of sprocket wheels, chains connecting the latter with the sprocket wheels having the connecting rods, a transverse shaft having a series of cams arranged to actuate the operating levers and suitable operating mechanism, substantially as and for the purpose herein set forth.

9. In a machine for stemming tobacco, the combination with the frame, of a vertically movable platform, a removable box or tray, supported thereon and having a series of compartments each adapted to hold a pile or stack of tobacco leaves, mechanism for feeding the platform carrying said tray or box intermittingly in an upward direction and mechanism for removing the leaves, singly, from the stacks or piles in said tray or box, substantially as set forth.

10. The combination of the frame, the vertically movable platform, mechanism for imparting to the said platform a slow intermittent motion in an upward direction, a box or tray mounted detachably upon the said platform and the vertically and laterally reciprocating suction cups, substantially as and for the purpose set forth.

11. The combination with the vertically and laterally movable suction cups, of the vertically movable platform, a box or tray mounted detachably on said platform and having a series of compartments corresponding with the suction cups, the transverse shaft having the winding drums, the ropes connecting the latter with the vertically movable platform, and mechanism for imparting an intermittent rotary motion to the said shaft, substantially as herein set forth.

12. In a machine for stemming tobacco, the combination of the vertically reciprocating suction tubes, having flexible extensions provided with suction cups at their lower ends, mechanism for laterally reciprocating said suction cups, at the upper limit of their vertical movement, a vertically movable platform, a removable box or tray carried by the platform and having compartments, adapted to register with the suction cups and mechanism for imparting to the said platform an intermittent movement, in an upward direction, substantially as set forth.

13. In a machine for stemming tobacco, the combination of the frame, the vertically movable platform, having an intermittent movement in an upward direction, a guard plate having a rearwardly inclined upper end to form a guiding platform or delivery table and the suction cups having a combined vertical and lateral reciprocatory movement, substantially as and for the purpose set forth.

14. The combination with the suction cups having a combined vertical and lateral reciprocatory movement, of the vertically movable platform, the ropes connecting the latter with winding drums upon a transverse shaft, a belt connecting a band wheel upon said shaft with a pulley upon a transverse countershaft, mechanism for imparting an intermittent rotary movement to the latter, a lever carrying at its upper end a tightening pulley adapted to bear against the belt, a notched arm pivoted to said lever, and adapted to engage a suitably arranged catch, and a guiding clamp, attached to the vertically movable platform and adapted to actuate the said notched arm, and to disengage it from the catch, when the said platform, reaches the upper limit of its movement, substantially as and for the purpose set forth.

15. In a machine for stemming tobacco leaves, the combination with suitably arranged guide rollers of two sets of endless bands, arranged thereon and constituting a carrier adapted to grasp the leaf and mechanism for removing the stem from the leaf while it is being held and conveyed by said carrier, substantially as set forth.

16. In a machine for stemming tobacco leaves the combination of the feeding devices, the stem gripping devices coacting therewith and consisting of oppositely reciprocating holders having devices for grasping the stems of the tobacco leaves, and mounted in a revoluble cylinder, and a knife located between the feeding and gripping devices and acting on the tobacco between the stem and the leaf, substantially as set forth.

17. In a machine for stemming tobacco leaves, the herein described revolving stemming cylinder provided with transversely and oppositely reciprocating holders having devices adapted to grasp the stems of the tobacco leaves, substantially as set forth.

18. In a machine for stemming tobacco leaves, the herein described revolving stemming cylinder—having longitudinal grooves, in combination with the transversely and oppositely reciprocating holders mounted in the said grooves, and having devices for grasping the stems of the tobacco leaves substantially as set forth.

19. The longitudinally grooved revoluble stemming cylinder, having the transversely and oppositely reciprocating holders arranged in pairs in each groove, said holders being provided with outwardly extending shanks, having laterally extending cutting blades provided with sharpened meeting edges, substantially as set forth.

20. The herein described revoluble stemming cylinder having annular rims or flanges and provided with longitudinal grooves intersecting the said flanges, in combination with the transversely and oppositely reciprocating holders, arranged in pairs, in the said grooves, and having devices for grasping the stems of the tobacco leaves substantially as set forth.

21. The revoluble stemming cylinder, having the transversely reciprocating holders arranged in pairs, said holders having devices for grasping the stems of the tobacco leaves and provided at their outer ends with inwardly extending radial arms, in combination with stationary cams arranged to engage the said arms and to force the said holders in opposite directions, and means for forcing the said holders in a reverse direction substantially as set forth.

22. The combination with the revoluble stemming cylinder having transversely reciprocating holders arranged in pairs; said holders having devices for grasping the stems of the tobacco leaves and said holders being also provided with inwardly extending arms at their outer ends, of the stationary disks arranged at the ends of said cylinders and having semi-peripheral cams engaging the inner sides of the said arms, and the stationary caps arranged at the ends of the cylinder and having semi-peripheral cams engaging the outer sides of said arms, substantially as set forth.

23. In a machine for stemming tobacco, the combination with the revoluble stemming cylinder having transversely and oppositely reciprocating holders, having devices for grasping the stems of the tobacco leaves, of the caps arranged at the ends of said cylinder and provided with laterally extending flanges that serve to retain the said transversely reciprocating holders, and means for operating the latter in their bearings, substantially as set forth.

24. In a machine for stemming tobacco, the combination of the revoluble stemming cylinder having longitudinal grooves, the transversely reciprocating holders, mounted in said grooves, and having devices for grasping the stems of the tobacco leaves, and inwardly extending radial arms, at their outer ends, the stationary caps arranged at the ends of said cylinder and having laterally extending flanges forming bearings to retain the transversely reciprocating holders in the grooves in which they are mounted and semi-peripheral cams adapted to bear against the outer sides of the arms, of said holders and the stationary disks arranged within the said caps at the ends of the cylinder and having semi-peripheral cams adapted to bear against the inner sides of the arms, of the transversely reciprocating holders, substantially as set forth.

25. In a machine for stemming tobacco, the combination with the revolving stemming cylinder, having transversely reciprocating holders, said holders having devices for grasping the stems of the tobacco leaves and provided at their outer ends with inwardly extending radial arms, of the stationary caps, mounted at the ends of the cylinder and having laterally extending flanges to retain the transversely reciprocating holders in their bearings, the stationary disks arranged within said caps at the ends of the cylinder and having perforations to receive pins extending laterally from said caps and the semi-peripheral flanges on diametrical opposite sides of said caps and disks, having beveled ends and adapted to bear respectively against the outer and the inner sides of the radial arms of the transversely reciprocating holders, which are thereby forced in pairs in opposite directions, substantially in the manner and for the purpose herein shown and specified.

26. In a machine for stemming tobacco leaves, the herein described revolving stemming cylinder having transversely reciprocating holders arranged in pairs, said holders being provided with outwardly extending devices for grasping the stems of the tobacco leaves, in combination with mechanism whereby the holders of one half of the cylinder shall be forced in opposite directions toward each other and be held in active position, while the holders of the opposite half of the cylinder shall be forced apart from each other, and held in position ready to grasp the tobacco stem, substantially as and for the purpose set forth.

27. The combination of the revoluble stemming cylinder having devices for grasping the stems of the tobacco leaves, a carrier for feeding the leaves past the stemming cylinder, said carrier being composed in part of two sets of endless bands, and a flexible roller arranged to press the said two sets of endless bands toward the face of the stemming cylinder, substantially as set forth.

28. The combination of the revolving stemming cylinder having transversely and oppositely reciprocating holders provided with devices for grasping the stems of the tobacco leaves, a flexible guide roller, mounted with its face in contact with the face of the stemming cylinder, or approximately so, and two sets of endless bands mounted upon suitable guide rollers of which the said flexible guide roller is one, and co-acting to form a carrier and both sets of endless bands being held by the said flexible roller, in contact with the face of the said stemming cylinder, substantially as set forth.

29. The combination with the revoluble stemming cylinder having devices for grasping the stems of the tobacco leaves, of the carrier comprising two sets of endless bands, mounted upon suitable rollers, one of which is vertically adjustable and adapted to hold the bands of both sets in contact with the face of the stemming cylinder, or approximately so, substantially as and for the purpose set forth.

30. The frame provided at its ends with annular rings, in combination with the guide rollers arranged in an annular series and mounted upon shafts having their bearings in the said rings, brackets extending upwardly from the latter, annularly grooved guide rollers journaled in said brackets, the revoluble stemming cylinder mounted transversely in the frame, a flexible roller mounted above and to the rear of the stemming cylinder, a guide roller mounted in front of the latter, a series of endless bands, mounted upon said guide rollers and flexible roller, and guided by the grooves in the annularly grooved rollers, a flexible roller arranged above and in front of the stemming cylinder, and in contact with the face of the latter, or approximately so, an annularly grooved guide roller, mounted in brackets extending from the rear frame bars, endless bands mounted upon the last named flexible roller and annularly grooved guide roller, and passing over the flexible roller above and in rear of the stemming cylinder, the two sets of endless bands and the guide rollers and flexible rollers upon which said bands are mounted co-acting to form the leaf carrier all arranged and operating substantially as and for the purpose set forth.

31. The combination of the revolving stemming cylinder having stem-grasping devices thereon, mechanism for carrying the tobacco leaf past the said revolving stemming cylinder, and a transversely reciprocating cutter mounted above the face of said stemming cylinder, substantially as and for the purpose set forth.

32. The combination of the revolving stemming cylinder having stem-grasping devices thereon, the flexible roller mounted in contact with the latter or approximately so, the guide rollers, the endless bands or tapes mounted upon the said flexible roller and guide rollers, and the transversely reciprocating cutter, substantially as and for the purpose set forth.

33. The combination of the revolving stemming cylinder provided with means for grasping the stem of the leaf, the stationary caps arranged at its ends and having laterally extending flanges, the transversely reciprocating cutter mounted upon the said flanges, and mechanism for feeding the tobacco leaves past said stemming cylinder, substantially as described and for the purpose set forth.

34. The revolving stemming cylinder having transversely and oppositely reciprocating holders provided with outwardly extending devices for grasping the stems of the tobacco leaves, and annular rims or flanges in combination with the carrier having two sets of endless bands, a flexible roller arranged to force the endless bands of both sets in the direction of or in contact with the face of the said stemming cylinder, said flexible roller being one of the supporting rollers of one of the sets of endless bands and the transversely reciprocating cutter, substantially as and for the purpose set forth.

35. The combination of the revolving stemming cylinder having stem grasping devices thereon, the carrier comprising two sets of endless bands mounted on suitable guide rollers, one of the said guide rollers being arranged in front of and parallel to the stemming cylinder, and having a series of annular grooves formed intermediately between the set of bands of the carrier passing over said guide roller, substantially as set forth.

36. In a machine for stemming tobacco leaves, the combination with the revolving stemming cylinder having stem grasping devices thereon, of a carrier composed of suitable guide rollers and two sets of endless metallic bands, substantially as set forth.

37. The combination of the stemming cylinder having the annular rims or flanges and the transversely and oppositely reciprocating holders having devices for grasping the stems of the tobacco leaves, the carrier comprising suitable guide rollers and two sets of endless bands and a feeding mechanism comprising the suction cups having a combined vertical and lateral motion, substantially as and for the purpose set forth.

38. In a machine for stemming tobacco leaves, the combination of the revolving stemming cylinder, having annular rims or flanges and transversely reciprocating holders provided with outwardly extending grasping devices arranged between said flanges, the carrier, comprising suitably arranged guide rollers, and two sets of endless bands, and the feeding mechanism comprising the suction cups having a combined vertically reciprocating and rearward lateral movement, said suction cups being provided on their under sides with rearwardly converging flanges, substantially as set forth.

39. The combination of the revolving stemming cylinder having stem grasping devices thereon, the carrier comprising suitable guide rollers and two sets of endless bands, and the feeding mechanism comprising the suction box, the vertically reciprocating suction tubes having flexible extensions, the suction-cups mounted at the lower ends of said flexible tubes, the operating levers having pitmen connected with the lower ends of said flexible tubes, the revolving disks journaled below the fulcra of the operating levers and having laterally extending wrist pins and the rods connecting the latter with the pitmen, substantially as set forth.

40. The combination of the revolving stemming cylinder having stem grasping devices thereon, the carrier comprising suitable guide rollers, and two sets of endless bands, the feeding mechanism comprising the suction box, the vertically reciprocating suction tubes, having flexible extensions, the suction cups mounted at the lower ends of said flexible extensions, the operating levers, the pitmen connecting the latter with the lower ends of the flexible tubes, the revolving disks journaled below the fulcra of the operating levers and having laterally extending wrist pins, the rods connecting the latter with the pitmen, a vertically movable platform, a box or tray mounted detachably upon the latter and having compartments to correspond with the suction cups, and mechanism for imparting to the said platform an intermittent movement in an upward direction, substantially as set forth.

41. The combination of the revolving stemming cylinder having stem grasping devices thereon, the carrier comprising suitably arranged guide rollers and two sets of endless bands, the feeding mechanism comprising the suction cups having a combined vertical and rearward lateral movement, and a rock shaft arranged in rear of the discharge end of the carrier and having forwardly extending curved fingers, and mechanism for imparting to the said rock shaft a rapid vibratory motion, substantially as set forth.

42. In a machine for stemming tobacco leaves, the combination of the revolving stemming cylinder having stem grasping devices thereon, the guide rollers arranged in a segmental series below the said stemming cylinder, the carrier comprising two sets of endless bands mounted upon the aforesaid segmentally arranged guide rollers and upon additional suitably arranged guide rollers, a cylindrical casing mounted in the frame within the segmental series of guide rollers and having a slot in its upper side and guard plates extending upwardly from the said slot in front and in rear of the stemming cylinder, substantially as set forth.

43. The combination of the frame, the revolving stemming cylinder having stem-grasping devices thereon, a cylindrical casing arranged below the latter and having a slot in its upper side and guard plates extending upwardly in front and in rear of the stemming cylinder, said cylindrical casing being open at one end, the carrier comprising two sets of endless bands and suitably arranged guide rollers, the feeding mechanism comprising the suction box, the vertically movable suction pipes and extensions and the suction cups at the lower ends of the latter, and connecting pipes connecting the suction box with the casing of an exhaust fan and connecting the discharge opening of said fan case with an opening in the closed end of the cylindrical casing arranged below the stemming cylinder, substantially as and for the purpose set forth.

44. In an organized machine, for stemming tobacco leaves, the combination of the frame, the stemming cylinder having stem grasping devices thereon, the transversely reciprocating cutter, the carrier comprising suitable guide rollers and two sets of endless bands, both of which are held in contact with the face of the stemming cylinder, or approximately so, a vertically adjustable flexible roller, the feed mechanism comprising the suction box, the vertically reciprocating suction tubes having flexible extensions and the suction cups at the lower end of the latter, the operating levers, the pitmen connecting the latter with the flexible suction tubes, the revolving disks having laterally extending wrist pins, the rods connecting the latter with the pitmen, a vertically movable platform, supporting a removable box or tray having compartments to correspond with the suction cups, mechanism for imparting to the said platform an intermittent movement in an upward direction, a cylindrical casing arranged within the frame below the stemming cylinder, and having a slot in its upper side, guard plates extending upwardly from the said slot in front and in rear of the stemming cylinder, pipes connecting the closed end of the cylindrical casing and the suction box, with the fan case of an exhaust fan adapted to exhaust the suction box and to discharge the blast through the open end of the cylindrical casing, a vibratory rake or platen, arranged below and in rear of the discharge end of the carrier and suitable operating mechanism, the whole combined, arranged and operating substantially as and for the purpose set forth.

In testimony that I claim the foregoing as my own I have affixed my signature in presence of two witnesses.

ROBERT W. COFFEE.

Witnesses:
J. H. SIGGERS,
E. G. SIGGERS.